United States Patent
Warke et al.

(10) Patent No.: US 10,145,948 B2
(45) Date of Patent: Dec. 4, 2018

(54) METHODS AND APPARATUS FOR NARROWBAND RANGING SYSTEMS USING COARSE AND FINE DELAY ESTIMATION

(71) Applicant: Texas Instruments Incorporated, Dallas, TX (US)

(72) Inventors: Nirmal C. Warke, Saratoga, CA (US); David P. Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 298 days.

(21) Appl. No.: 15/208,948

(22) Filed: Jul. 13, 2016

(65) Prior Publication Data
US 2018/0017672 A1    Jan. 18, 2018

(51) Int. Cl.
*G01S 13/08* (2006.01)
*G01S 15/08* (2006.01)
*G01S 17/08* (2006.01)
*G01S 13/00* (2006.01)

(52) U.S. Cl.
CPC .............. *G01S 13/08* (2013.01); *G01S 15/08* (2013.01); *G01S 17/08* (2013.01)

(58) Field of Classification Search
CPC .......... G01S 13/08; G01S 17/08; G01S 15/08; G01S 7/354; G01S 17/36
See application file for complete search history.

(56) References Cited

U.S. PATENT DOCUMENTS 2,562,977 A * 8/1951 Woodyard ............... G01S 1/02
                                                116/298
3,603,989 A * 9/1971 Caspers ................ G01S 7/2923
                                                342/195
3,614,226 A * 10/1971 Vergoz .................. G01S 17/105
                                                342/118

(Continued)

FOREIGN PATENT DOCUMENTS

WO      2009034335 A1    3/2009

OTHER PUBLICATIONS

International Search Report for PCT/US2017/041977 dated Oct. 19, 2017.

*Primary Examiner* — Bernarr E Gregory
(74) *Attorney, Agent, or Firm* — Michael A. Davis, Jr.; Charles A. Brill; Frank D. Cimino

(57) ABSTRACT

Methods and apparatus to determine a distance to a target using coarse and fine delay estimation based on a narrowband transmit signal are disclosed. An example apparatus includes a transducer to receive a reference signal and a reflected signal, the reflected signal being the reference signal after being reflected of a target; a filter to generate a band-pass reference signal and a band-pass reflected signal by filtering (A) reference signal samples associated with the reference signal and (B) reflected signal samples associated with the reflected signal; a correlator to generate a first correlation by correlating the reference signal samples with the reflected signal samples and a second correlation by correlating the band-pass reference signal with the band- (Continued)

pass reflected signal; and a delay estimator to determine a distance to the target based on the first correlation (coarse delay) and the second correlation (fine delay) and output a signal including the distance to the target.

20 Claims, 8 Drawing Sheets

(56) References Cited

U.S. PATENT DOCUMENTS

| | | | | |
|---|---|---|---|---|
| 3,916,410 | A * | 10/1975 | Elwood | G01S 5/14 |
| | | | | 342/458 |
| 5,082,364 | A * | 1/1992 | Russell | G01S 17/36 |
| | | | | 356/5 |
| 6,307,622 | B1 | 10/2001 | Lewis | |
| 6,373,427 | B1 * | 4/2002 | Hohne | G01S 7/354 |
| | | | | 342/128 |
| 6,587,187 | B2 * | 7/2003 | Watanabe | G01S 7/493 |
| | | | | 342/118 |
| 2011/0301914 | A1 | 12/2011 | Maltseff | |

* cited by examiner

FIG. 6
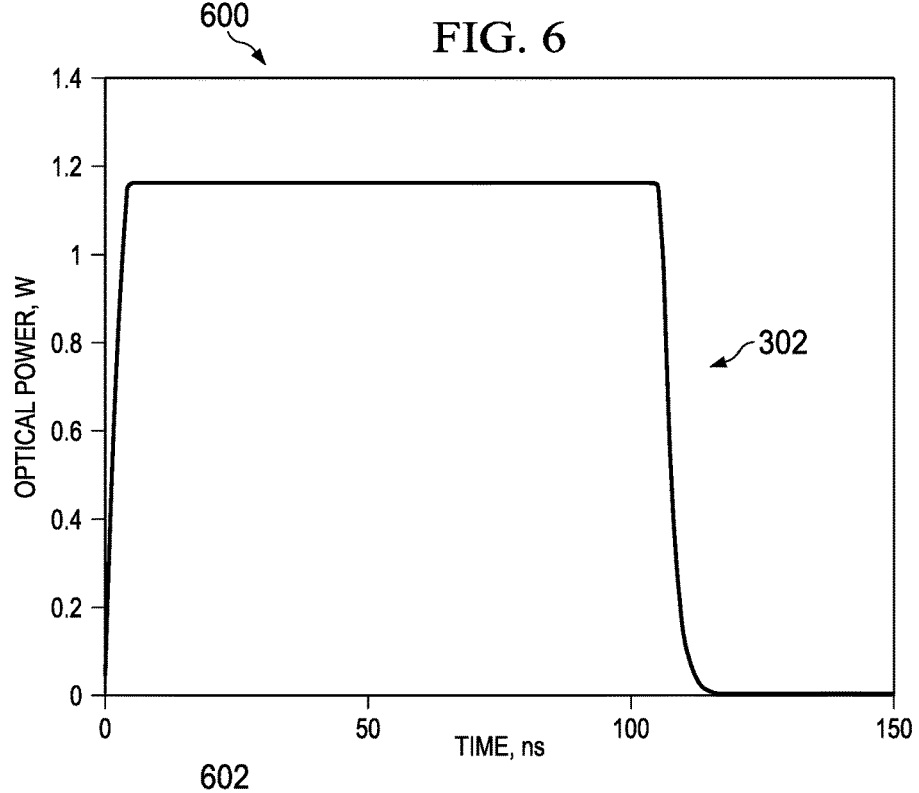
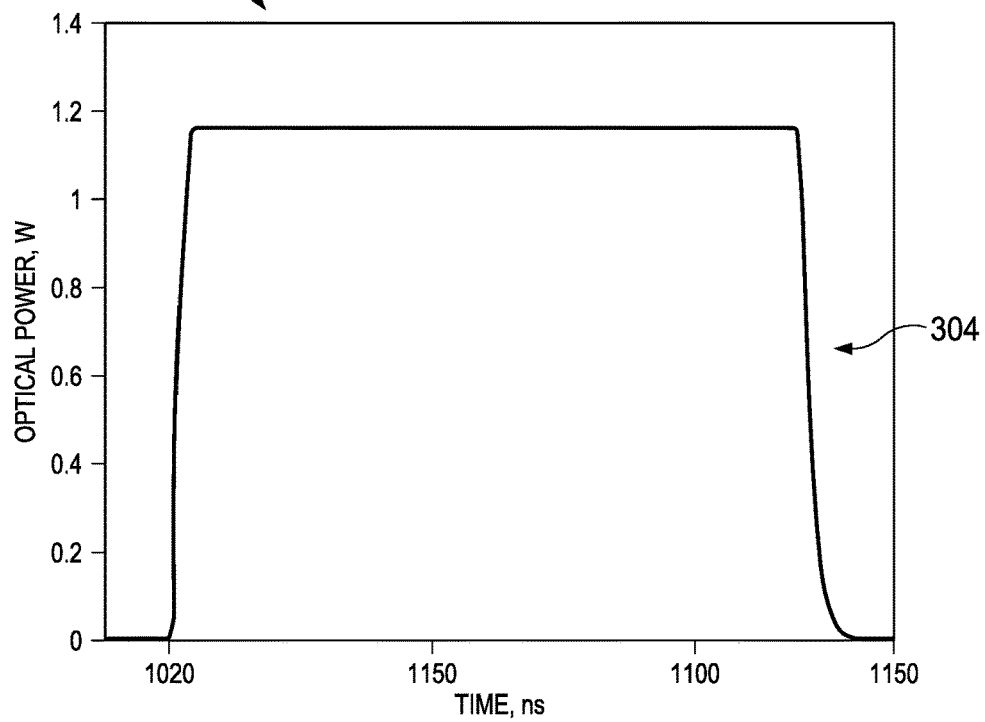

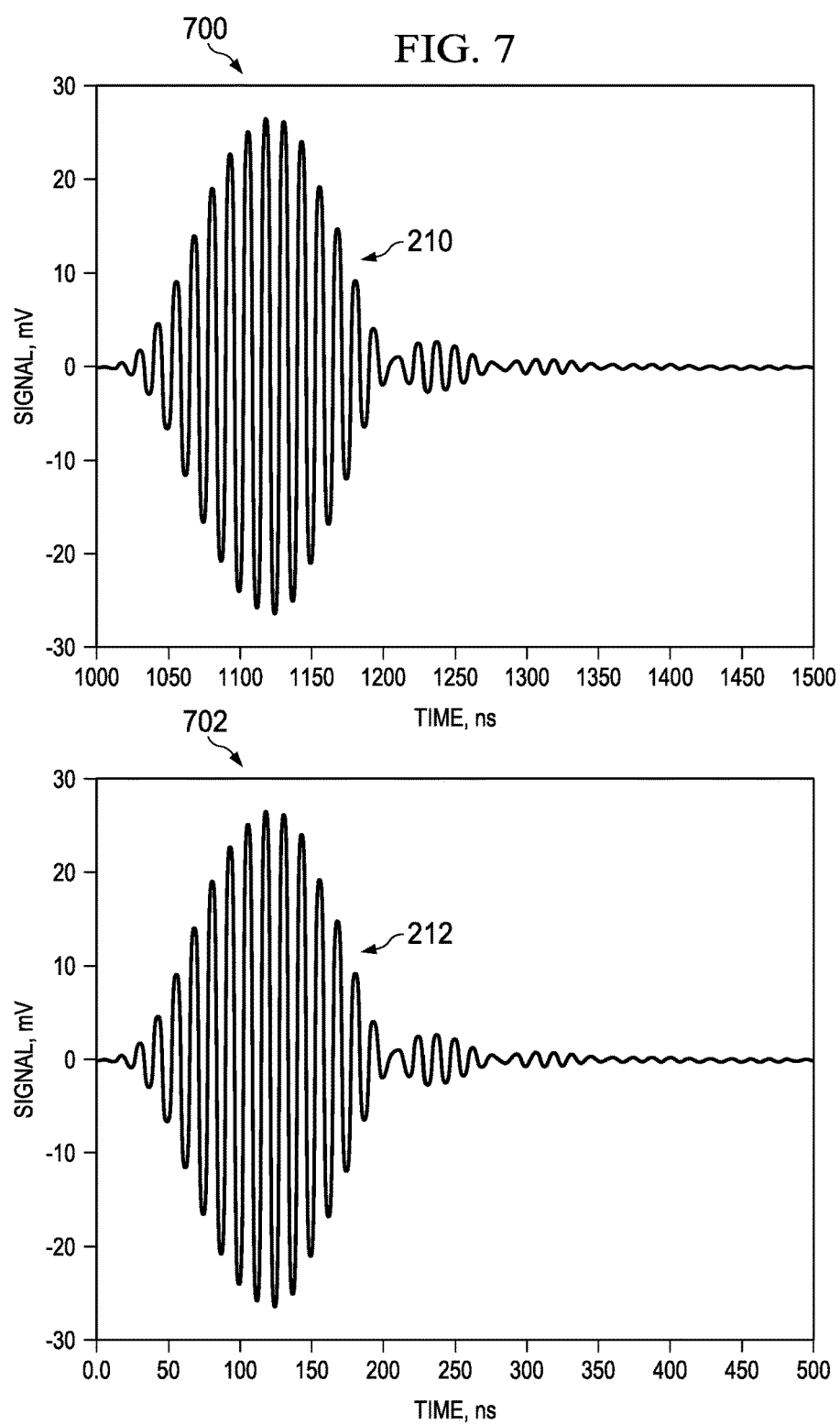

METHODS AND APPARATUS FOR NARROWBAND RANGING SYSTEMS USING COARSE AND FINE DELAY ESTIMATION

FIELD OF THE DISCLOSURE

This disclosure relates generally to ranging systems and, more particularly, to methods and apparatus for narrowband ranging systems using coarse and fine delay estimation.

BACKGROUND

A ranging system (e.g., RADAR, LIDAR, SONAR, etc.) determines a distance to a target by transmitting a signal (e.g., radio signals, light signals, sound signals, etc.) at the target. The transmitted signal is reflected off the target and back to the ranging system. The ranging system compares received signals to the transmitted signal to determine when the reflected signal has been received. Such a ranging system measures the distance to the target based on the amount of time between when the signal was transmitted and when the reflected signal was received.

SUMMARY

Examples disclosed herein determine a distance to a target using coarse and fine delay estimation based on a narrowband transmit signal. An example method includes a transducer to receive a reference signal and a reflected signal, the reflected signal being the reference signal after being reflected of a target. Such an apparatus further includes a filter to generate a band-pass reference signal and a band-pass reflected signal by filtering (A) reference signal samples associated with the reference signal and (B) reflected signal samples associated with the reflected signal. Such an apparatus further includes a correlator to generate a first correlation by correlating the band-pass reference signal with the band-pass reflected signal and a second correlation by correlating the reference signal samples with the reflected signal samples. Such an apparatus further includes a delay estimator to determine a distance to the target based on the first correlation and the second correlation and output a signal including the distance to the target.

BRIEF DESCRIPTION OF THE DRAWINGS

FIG. 6 illustrates graphs of an example windowed reflected signal and an example windowed reference signal of FIG. 2.

FIG. 7 illustrates graphs of an example band-pass reflected signal and an example band-pass reference signal of FIG. 2.

The figures are not to scale. Wherever possible, the same reference numbers will be used throughout the drawing(s) and accompanying written description to refer to the same or like parts.

DETAILED DESCRIPTION

Figure 1:
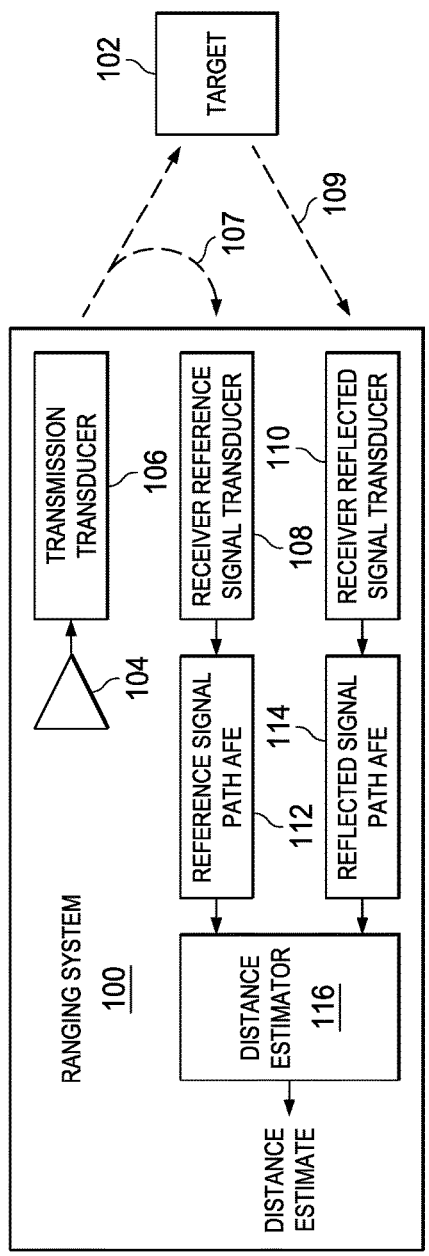
FIG. 1 is an illustration of an example ranging system that determines a distance to an example target.

Ranging systems used to determine distances to various objects have become increasingly popular with advances in robotic technologies, automotive technologies, etc. Ranging systems determine distances by transmitting a signal to an object (e.g. a target). The transmitted signal reflects off the object and returns to the ranging system. The ranging system determines when the reflected signal has been received and determines the distance of the target based on the duration of time between when the signal was transmitted and when the reflected signal was received. Example ranging systems include radio detection and ranging (RADAR) systems, light detection and ranging (LIDAR) systems, sound detection and ranging (SONAR) systems. Ranging systems may be used to help robots interact with objects, transport to various locations, etc. Additionally, ranging systems may be used in automobiles to provide safety features and autonomous driving systems. Distance estimation from such ranging systems requires high accuracy and precision to properly function. As ranging systems become more popular, a low cost, less complex, power saving implementation of a ranging system is highly desirable.

Ranging systems are implemented by transmitting a signal to reflect off a target and return back to the ranging system. Such ranging systems calculate the distance to the target based on the amount of time it takes for the signal to reach the target, reflect off the target, and return to the ranging system (e.g., the time of flight of the reflected signal).

One conventional technique of implementing a ranging system includes low-pass filtering a reflected signal and converting the reflected low-pass filtered signal into low-pass filtered reflected samples. The low-pass filtered reflected samples are compared (e.g., correlated) to a low-pass filtered transmitted signal samples (e.g., corresponding to the signal prior to being reflected off the target) to determine when the reflected signal samples match the transmitted signal samples based on a peak intensity value (e.g., the highest intensity value) of the correlation. The peak corresponds to a time sample identifying the time of flight of the transmitted signal after being reflected off a target and returned to the ranging system (e.g., the reflected signal). The time of flight of the reflected signal corresponds to the distance of the target. However, correlating low-pass filtered reference signals with low-pass filtered reflected signals to determine a distance of a target is accurate (e.g., has low ambiguity) but not precise. Because the reflected signal is subject to noise, the correlation of the low-pass filtered reflected signal samples and the low-pass filtered reflected signal samples may include spikes that affects (e.g., decreases the accuracy of) the estimation of the distance.

Another conventional technique of implementing a ranging system includes band-pass filtering a received reflected signal and converting the received reflected band-pass filtered signal into band-pass filtered reflected samples. The band-pass filtered reflected samples are compared (e.g., correlated) to band-pass filtered transmitted reference signal samples to determine when the received reflected signal samples match the transmitted reference signal samples based on a peak intensity value of the correlation. The peak value corresponds to a time sample identifying the time of flight of the reflected signal. The time of flight of the reflected signal corresponds to the distance of the target. However, correlating band-pass filtered reference signals with band-pass filtered reflected signals to determine a distance of a target is precise but not accurate. When two bandpass filtered signals are correlated, the correlation includes multiple local peaks outside of the main peak. The local peaks located closest to the main peak are herein referred to as side lobes and the main peak (e.g., highest intensity value of a correlation) is herein referred to as the peak. Because the reflected signal is subject to noise, the correlation of the band-pass filtered reflected signal samples and the band-pass filtered reference signal samples may include spike on a side lobe causing the intensity value of the side lobe to increase to an intensity value higher than the main peak. Accidentally identifying a side lobe as a main peak due to noise is herein referred to as a cycle slip. Such conventional techniques have a high probability of cycle slips leading to inaccurate distance estimations. Examples disclosed herein provide a ranging system with the accuracy of a low-pass correlation and the precision of a band-pass correlation.

Examples disclosed herein include (A) applying a coarse correlation between low-pass filtered reference signal samples with low-pass filtered reflected signal samples to determine a coarse (e.g., accurate but not precise) time delay estimate, (B) applying a fine correlation between band-pass filtered reference signal samples with band-pass filtered reflected signal samples to determine a fine (e.g., precise but not accurate) time delay estimate, and (C) determining a distance to a target based on combining the coarse time delay estimate and the fine time delay estimate. Using examples disclosed herein, both accuracy and precision are optimized and the probability of cycle slip is substantially reduced. Examples disclosed herein reduce range error standard deviation by 18%. Thus, examples disclosed herein allow a ranging system to reduce signal transmission power by roughly 20% without affecting the range error standard deviation.

In some examples, low-pass narrowband reference signals and low-pass narrowband reflected signals are windowed prior to applying a coarse correlation to reduce the peak to side lobe ratio and lower the ambiguity (e.g., increasing the accuracy and decreasing the probability of a cycle slip) associated with estimating a distance to a target. Windowing low-pass signals lowers the side lobes of the coarse correlation of the low-pass signals at the expense of further decreasing the precision of the coarse correlation. However, since the coarse correlation is only used determine a coarse time delay and the fine correlation is used to determine the optimal time delay based on the coarse time delay, windowing may be used to further increase the accuracy of a distance estimation.

As used herein, a "reference signal" is defined as the signal transmitted by a transmission transducer after being received by a receiver transducer and "reflected signal" is defined as the transmitted signal after being reflected off of the object and received by a receiver transducer. Although the reference signal and the reflected signal are based on the same transmitted signal, the reference signal is measured at transmission and the reflected signal is measured after reflection and return. Thus, the reflected signal has to travel a much farther distance and may be subject to additional noise and may be oscillating with a different phase and/or may have a different amplitude than the reference signal. As used herein, a time delay is herein defined as the time of flight of a reflected signal. As used herein, low-pass filtered signals are used interchangeably with low-pass signals and band-pass filtered signals are used interchangeably with band-pass signals.

The illustration of FIG. 1 illustrates an example ranging system 100 to determine a distance to the example target 102. The example ranging system 100 includes an example transmission signal generator 104, an example transmission transducer 106, an example transmitted signal 107, an example receiver reference signal transducer 108, an example reflected signal 109, an example receiver reflected signal transducer 110, an example reference signal path analog front end device (AFE) 112, an example reflected signal path AFE 114, and an example distance estimator 116.

The example ranging system 100 of FIG. 1 is a system that transmits signals to the example target 102 and receives reflected signals 109 (e.g., the transmitted signals 107 reflected off the example target 102) to determine a distance of the example target 102. The example ranging system 100 may be a RADAR system, a LIDAR system, a SONAR system, an ultrasonic system, a hybrid system, and/or any other type of ranging system. As described above, a RADAR system utilizes radio signals (e.g., electromagnetic waves), a LIDAR system utilizes light signals, and a SONAR system utilizes and/or ultrasonic system sound signals, and a hybrid system uses a light signal modulated with a radio signal.

The example transmission signal generator 104 of FIG. 1 generates signals to be reflected off the example target 102. As described above, the signals may be light signals, sound signals, radio signals, hybrid signals, and/or any other type of signal. In some examples, the transmission signal generator 104 generates a pulse, a sinusoid, a square wave, a triangle wave, and/or any of type of signal. In the illustrated example of FIG. 1, because bandpass filtering narrowband signals maximizes signal to noise ratio (SNR) (e.g., leading to increased precision), the example transmission signal generator 104 generates narrowband signals. Alternatively, the example transmission signal generator 104 may generate any type of signal. The example transmission signal generator 104 transmits the generated signal to the example transmission transducer 106 to transmit the generated signal (e.g., the transmitted signal 107).

The example transmission transducer 106 of FIG. 1 is an electrical device that outputs the generated signal from the example transmissions signal generator 104. In some examples, the transmission transducer 106 is an antenna (e.g., a beamform antenna) to transmit the signal (e.g., light signal, radio signal, and/or sound signal) to the example target 102. Alternatively, the transmission transducer 106 may be a diode (e.g. a light emitting diode, a laser diode, etc.) and/or any device capable of outputting light signals, radio signals, and/or sound signals.

The example receiver reference signal transducer 108 of FIG. 1 receives the transmitted signal 107 without being reflected off the example target 102 and processes the transmitted signal 107 to generate a reference signal. The received transmitted signal 107 may be different from the signal generated by the example transmission signal generator 104 due to front end system delay and/or other non-idealities. In some examples, the transmitted signal 107 is the ideal signal generated by the example transmission signal generator 104. The receiver reference signal transducer 108 includes a low-pass filter to filter high frequency noise of the transmitted signal 107. The example receiver reference signal transducer 108 may be an antenna (e.g., a beamform antenna) and/or a diode (e.g. photodiode) to receive the signal (e.g., light signal, radio signal, and/or sound signal) from the example transmission transducer 106. Alternatively, the example receiver reference signal transducer 108 may be any device capable of receiving light signals, radio signals, and/or sound signals.

The example receiver reflected signal transducer 110 of FIG. 1 receives the reflected signal 109 (e.g., the transmitted signal 107 after being reflected off the example target 102). A received signal that is reflected off the example target 102 is herein defined as a reflected signal. Because the reflected signal 109 is not received directly from the example transmission transducer 106 (e.g., the transmitted signal 107 is reflected off the example target 102 and travels a long distance), the reflected signal 109 is subject to additional noise and may have a smaller SNR ratio than the reference signal. The receiver reflected signal transducer 110 includes a low-pass filter to remove high frequency noise from the reflected signal 109. In some examples, the example reflected signal transducer 110 is an antenna (e.g., a beamform antenna) and/or a diode (e.g. photodiode) to receive the signal (e.g., light signal, radio signal, and/or sound signal) from the example transmission transducer 106 after being reflected of the example target 102. The example receiver reflected signal transducer 110 may be any device capable of receiving light signals, radio signals, and/or sound signals. In some examples, the receiver reflected signal transducer 110 includes a low-pass filter and a band limit filter to band limit the reference signal.

The example reference signal path AFE 112 and the example reflected signal path AFE 114 of FIG. 1 are devices that include analog to digital converters to convert the analog reference and reflected signals 109 and the reference signals to digital samples. The digital samples of the low-pass reference signal and the low-pass reflected signal are a digital representation of the analog signals. In some examples, the reference signal AFE 112 and the reflected signal AFE 114 may be combined into one AFE that includes one or more analog to digital converts to convert the reflected signals 109 and the reference signals to digital samples. In some examples, components of the reference signal AFE 112 and/or the reflected signal AFE 114 may be shared between the reference signal path and the reflected signal path. The digital samples of the low-pass reference signal and the low-pass reflected signal are transmitted to the example distance estimator 116 for further processing.

The example distance estimator 116 of FIG. 1 receives the low-pass reference signal samples and the low-pass reflected signal samples and generates two correlations. The first correlation is a coarse correlation used to determine a coarse delay estimation corresponding to a distance of the example target 102 with high ambiguity and the second correlation is a fine correlation used to determine a fine delay estimation corresponding to the distance of the example target 102 with low ambiguity. As described above, the coarse estimation is used to determine a time sample range and the fine estimation is used to determine the optimal time sample within the time sample range. The optimal time corresponds to a distance of the example target 102. As further described in conjunction with FIG. 2, the coarse correlation is a correlation of the low-pass reflected signal samples with the low-pass reference signal samples. In some examples, the distance estimator 116 windows (e.g., applies a Hamming window) the low-pass samples prior to the coarse correlation to further reduce the ambiguity of the coarse estimation. Additionally, the low-pass reflected signal samples and the low-pass reference signal samples are high-pass filtered to create a band-pass reflected signal and a band-pass reference signal. As further described in conjunction with FIG. 2, the fine correlation is a correlation of the band-pass reflected signal samples and the band-pass reference signal samples. In some examples, the distance estimator 116 outputs a distance estimate signal including the distance to the example target 102 to a circuit and/or processor within and/or coupled to the example ranging system 100.

Figure 2:
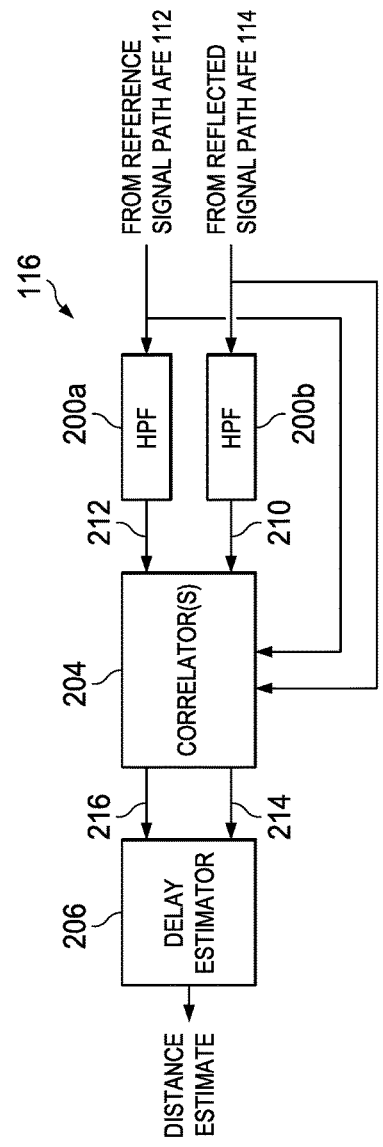
FIG. 2 is a block diagram of an example distance estimator of FIG. 1.

FIG. 2 is a block diagram of an example implementation of the distance estimator 116 of FIG. 1, disclosed herein, to determine the distance to the example target 102 of FIG. 1. While the example distance estimator 116 is described in conjunction with the example ranging system 100 and the example target 102 of FIG. 1, the example distance estimator 116 may be utilized to determine a distance to any target using any ranging system. The example distance estimator 116 includes example high-pass filters 200a, 200b, an example correlator(s) 204, an example delay estimator 206, example band-pass reflected signal samples 210, example band-pass reference signal samples 212, an example coarse correlation 214, and an example fine correlation 216.

The example high-pass filter 200a of FIG. 2 receives the low-pass reference signal samples from the reference signal path AFE 112 of FIG. 1 and the high-pass filter 200b receives the low-pass reflected signal samples from the reflected signal path AFE 114 of FIG. 1. The example high-pass filters 200a, 200b filter the low-pass signals from the low-pass reference signal samples and the low-pass reflected signal samples. In some examples, the high-pass filters 200a, 200b may be combined in a single high-pass filter capable of filtering both the low-pass reference signal and the low-pass reflected signal. High-pass filtering a low-pass signal generates a band-pass signal. Thus, the output of the example high-pass filters 200a, 200b is the example band-pass reflected signal samples 210 and the example band-pass reference signal samples 212. The example band-pass reflected signal samples 210 and the example band-pass reference signal samples 212 are transmitted to the example correlator(s) 204.

The example correlator(s) 204 of FIG. 2 correlates (e.g., using cross-correlation) the example band-pass reflected signal samples 210 with the example band-pass reference signal samples 212 to generate the example fine correlation 216. Additionally, the example correlator(s) 204 correlate the low-pass reflected signal samples and the low-pass reference signal samples to generate the example coarse correlation 214. The fine correlation identifies a similarity between the band-pass reflected signal and the band-pass reference signal and the coarse correlation identifies a similarity between the low-pass reflected signal samples and the low pass reference signal samples. In some examples, the example correlator(s) 204 cross correlates two signals using the following equation:

$$[S_1 * S_2](t) = \int_{-\infty}^{+\infty} S_1^*(\tau) S_2(\tau + t) d\tau \quad \text{(Equation 1)}$$

Where $S_1^*$ is the complex conjugate of $S_1$.

As described above, the example correlations 214, 216 include a peak intensity value and side lobes values associated with a time sample. The coarse correlation 214 includes a wide, less pronounced peak and the fine correlation 216 includes a narrow, more pronounced peak. The peak of the coarse correlation 214 corresponds to a coarse delay estimate associated with a distance to the example target 102 (FIG. 1) and the peak of the fine correlation 216 corresponds to a fine delay estimate associated with a distance to the example target 102. When noise is present in the reflected signal 109, the coarse delay estimate and the fine delay estimate may correspond to different time samples corresponding to different distant estimations. In some examples, the correlator(s) 204 is two correlators, a first correlator to perform the coarse correlation and a second correlator to perform the fine correlation. The example correlator(s) 204 transmits the example correlations (e.g. cross-correlations) 214, 216 to the example delay estimator 206.

The delay estimator 206 of FIG. 2 receives the example coarse correlation 214 and the example fine correlation 216 from the example correlator(s) 204. The example delay estimator 206 determines the coarse delay time sample based on the peak of the coarse correlation 214. As described above, because the coarse correlation 214 has a wider, less pronounced peak in the presence of noise, the coarse delay time sample for the coarse correlation 214 generates a less accurate estimate of the distance to the example target 102 than the fine correlation 216. Thus, the example delay estimator 206 also determines an optimal delay time sample based on (A) the peak of the fine correlation 216 and (B) the coarse delay time sample, as further described in conjunction with FIG. 4. The optimal delay time sample corresponds to the time of flight of the transmitted reflected signal 109 and the time of flight corresponds to the distance of the example target 102 of FIG. 1. In some examples, the delay estimator 206 determines the distance of the example target 102 based on the optimal time sample. The example delay estimator 206 transmits the distance estimate signal which corresponds to the optimal time sample, the time of flight, and/or the distance of the example target 102.

Figure 3:
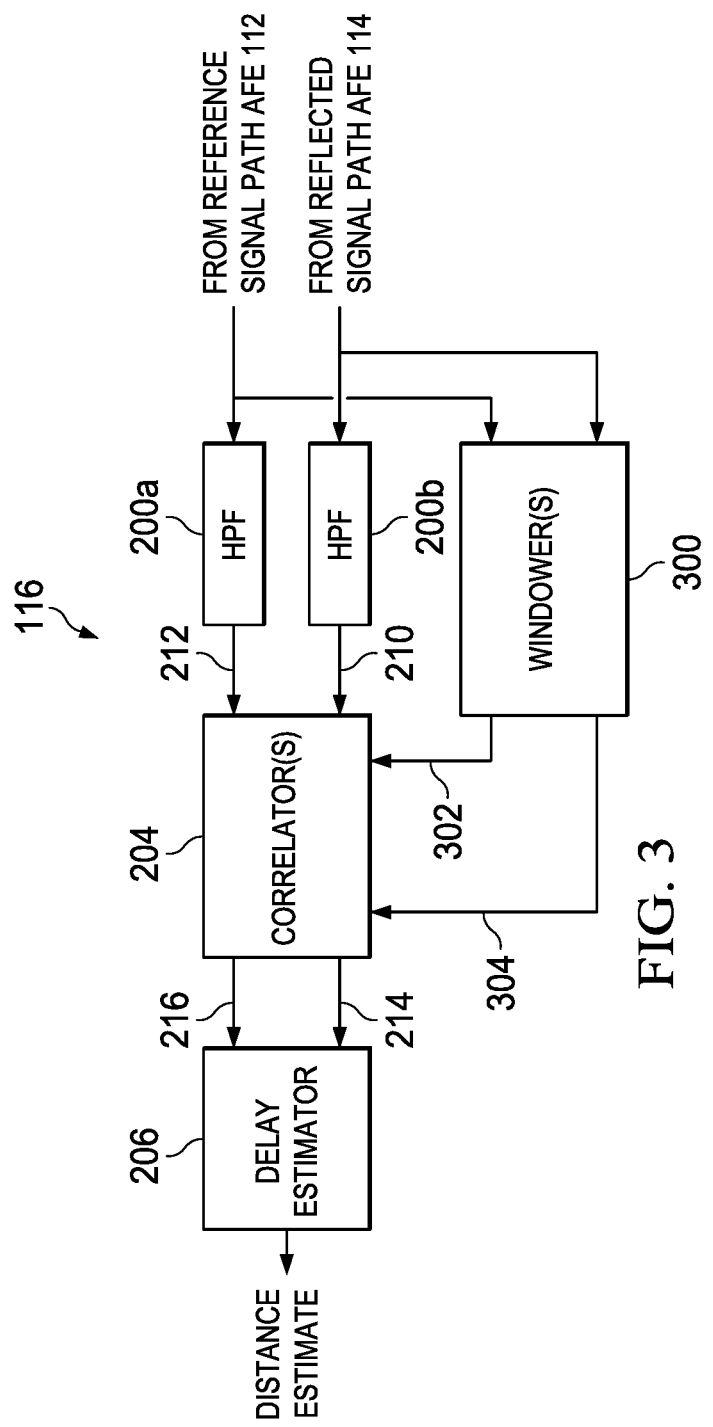
FIG. 3 is an alternative block diagram of the example distance estimator of FIG. 1.

FIG. 3 is a block diagram of an alternative example implementation of the distance estimator 116 of FIG. 1, disclosed herein, to determine the distance to the example target 102 of FIG. 1. While the example distance estimator 116 is described in conjunction with the example ranging system 100 and the example target 102 of FIG. 1, the example distance estimator 116 may be utilized to determine a distance to any target using any ranging system. The example distance estimator 116 includes example high-pass filters 200a, 200b, an example correlator(s) 204, an example delay estimator 206, example band-pass reflected signal samples 210, example band-pass reference signal samples 212, an example coarse correlation 214, and an example fine correlation 216 of FIG. 2. The example distance estimator 116 further includes an example windower(s) 300, an example windowed reference signal 302, and an example windowed reflected signal 304 to further increase the accuracy of a coarse correlation.

The example windower(s) 300 of FIG. 3 receives the low-pass reference signal samples from the example reference signal path AFE 112 and the low-pass reflected signal samples from the example reflected signal path AFE 114. The example windower(s) 300 windows the low-pass reference signal samples and the low-pass reflected signal samples to generate the example windowed reference signal 302 and the example windowed reflected signal 304. Windowing generates a rectangular window that is constant inside an interval of oscillation and zero everywhere else. Windowed signals create a lower side lobe when the windowed signals 302, 304 are correlated. Additionally, windowing generates a wider coarse peak range, as further described in conjunction with FIG. 8A. In some examples, the example windower(s) 300 includes two windowers, a first windower to window the low-pass reference signal samples and a second windower to window the low-pass reflected signal samples. The example windower(s) 300 may window using a B-spline window function, a Welch window function, a Hanning window function, a Hamming window function, and/or any other type of window function. Alternatively, the low-pass reference signal samples and the low-pass reflected signal samples may be transmitted directly to the example correlator(s) 204 without being windowed by the example windower(s) 300 (e.g., the example windower(s) 300 may be removed from the example distance estimator 116).

While example manners of implementing the example distance estimator 116 of FIG. 1 are illustrated in FIGS. 2 and/or 3, elements, processes and/or devices illustrated in FIGS. 2 and/or 3 may be combined, divided, re-arranged, omitted, eliminated and/or implemented in any other way. Further, the example high-pass filters 200a, 200b, the example correlator(s) 204, the example delay estimator 206, the example windower(s) 300, and/or, more generally, the example distance estimator 116 of FIGS. 2 and/or 3, may be implemented by hardware, machine readable instructions, software, firmware and/or any combination of hardware, machine readable instructions, software and/or firmware. Thus, for example, any of the example high-pass filters 200a, 200b, the example correlator(s) 204, the example delay estimator 206, the example windower(s) 300, and/or, more generally, the example distance estimator 116 of FIGS. 2 and/or 3, could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example high-pass filters 200a, 200b, the example correlator(s) 204, the example delay estimator 206, the example windower(s) 300, and/or, more generally, the example distance estimator 116 of FIGS. 2 and/or 3, is/are hereby expressly defined to include a tangible computer readable storage device or storage disk such as a memory, a digital versatile disk (DVD), a compact disk (CD), a Blu-ray disk, etc. storing the software and/or firmware. Further still, the example distance estimator 116 of FIGS. 2 and/or 3 includes elements, processes and/or devices in addition to, or instead of, those illustrated in FIG. 4, and/or may include more than one of any or all of the illustrated elements, processes and devices.

Figure 4:
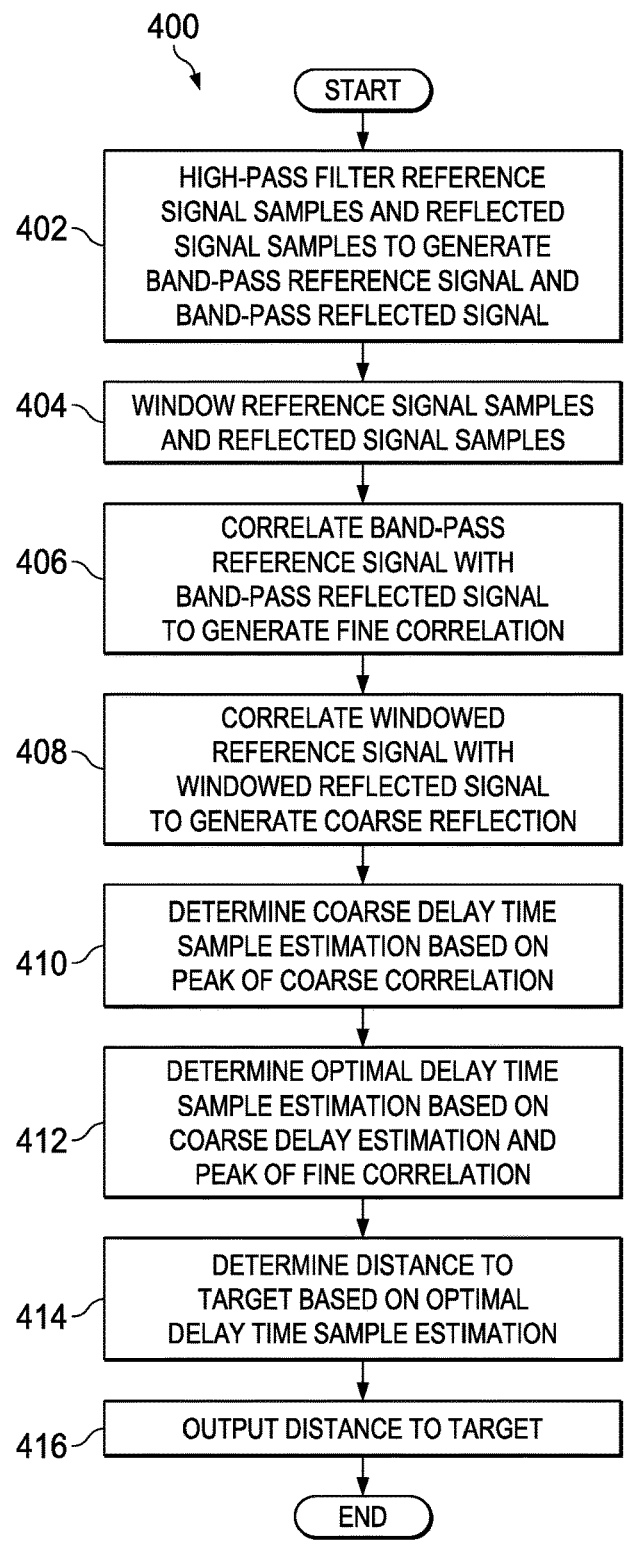
FIG. 4 is a flowchart representative of example machine readable instructions that may be executed to implement the example distance estimator of FIG. 2 to determine the distance to the example target of FIG. 1.

A flowchart representative of example machine readable instructions for implementing the example distance estimator 116 of FIGS. 2 and/or 3 is shown in FIG. 4. In the examples, the machine readable instructions comprise a program for execution by a processor such as the processor 912 shown in the example processor platform 900 discussed below in connection with FIG. 9. The program may be embodied in machine readable instructions stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 4, many other methods of implementing the example distance estimator 116 of FIGS. 2 and/or 3 may alternatively be used. For example, the order of execution of the blocks may be changed, and/or some of the blocks described may be changed, eliminated, or combined.

As mentioned above, the example process of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is an example flowchart 400 representative of example machine readable instructions that may be executed by the example distance estimator 116 of FIGS. 2 and/or 3 to determine the distance to the example target 102 of FIG. 1. As previously described, the determination of the distance is based on a duration of time between when a signal was transmitted and when the reflected signal 109 is received. The example distance estimator 116 determines the duration of time based on an optimal delay time sample corresponding to (A) a peak of the example coarse correlation 214 and (B) a peak of the example fine correlation 216 of FIG. 2. The optimal time sample corresponds to the best estimate of the distance to the example target 102.

The example high-pass filters 200a, 200b high-pass filters the low-pass reference signal samples from the example reference signal path AFE 112 and the low-pass reflected signal samples from the example reflected signal path AFE 114 to generate the example band-pass reference signal samples 212 and the example band-pass reflected signal samples 210 (block 402). An example of the band-pass reflected signal is shown and further described in FIG. 7. The example windower 300 windows the low-pass reference signal samples and the low-pass reflected signal samples (block 404). As described above in conjunction with FIG. 3, windowing the low-pass reference signal samples and the low-pass reflected signal samples causes the coarse interpolation to have a larger SNR, further decreasing the ambiguity of determining the peak of the coarse correlation. The windowed reference signal 302 and the windowed reflected signal 304 are transmitted to the example correlator(s) 204.

The example correlator(s) 204 correlates the band-pass reference signal samples 212 with the band-pass reflected signal samples 210 to generate the example fine correlation 216 (FIG. 2) (block 406). As described above in conjunction with FIG. 2, the correlator(s) 204 correlates the band-pass signals using Equation 1. An example of the result of the fine correlation 216 is shown and further described in conjunction with FIG. 8B. The example correlator(s) 204 transmits the example fine correlations 216 (FIG. 2) to the example delay estimator 206.

The example correlator(s) 204 correlates the band-pass reference signal samples 212 with the band-pass reflected signal samples 210 to generate the example coarse correlation 214 (FIG. 2) (block 408). As described above in conjunction with FIG. 2, the correlator(s) 204 correlates the band-pass signals using Equation 1. An example of the result of the example coarse correlation 214 is shown and further described in conjunction with FIG. 8A. The example correlator(s) 204 transmits the example coarse correlations 214 (FIG. 2) to the example delay estimator 206.

The example delay estimator 206 determines a coarse delay estimation based on the peak of the example coarse correlation 214 (block 410). The example delay estimator 206 determines the coarse delay time sample estimation by determining which time sample corresponds to the peak of the example coarse correlation 214. As described above, the coarse delay time sample estimation determines a time sample associated with a distance to the example target 102 (FIG. 1) that is accurate but not very precise. To optimize the time sample estimate (e.g., make the accurate estimate more precise), the example delay estimator 206 determines an optimal time delay time sample estimation based on the coarse delay estimation and the example fine correlation 216 (block 412). In some examples, the example delay estimator 206 may determine an optimal delay time sample based on the peak associated with the time sample closest to the coarse delay time sample estimate. For example, if the coarse delay sample estimate is associated with the $3,000^{th}$ time sample and the closest peak of the fine delay correlation 216 is associated with the $3,150^{th}$ time sample, the example delay estimator 206 determines the optimal delay time sample estimation to be associated with the $3,150^{th}$ time sample. In this manner, the probability of cycle slip is minimized because the coarse correlation determines the delay time sample range and the fine correlation determines the highly precise optimal delay time sample based on the delay sample range associated with the coarse correlation.

The example delay estimator 206 determines the distance to the example target 102 based on the optimal delay time sample estimation (block 414). As described above, each time sample corresponds to a distance of the example target 102. Thus, the optimal delay time sample estimation corresponds to a time of flight of the reflected signal 109 and distance of the target 102. In some examples, the example delay estimator 206 determines the distance of the target 102 based on the optimal delay time sample estimation directly. Alternatively, the example delay estimator 206 determines the distance of the target 102 by converting the optimal delay time sample estimation into a time value (e.g. nanoseconds) associated with the time of flight of the reflected signal 109 and then uses the time of flight to calculate the distance to the example target 102. The example delay estimator 206 outputs the distance to the example target 102 in a distance estimate signal to a circuit and/or processor coupled to and/or within the example ranging system 100 of FIG. 1 (block 416).

Figure 5:
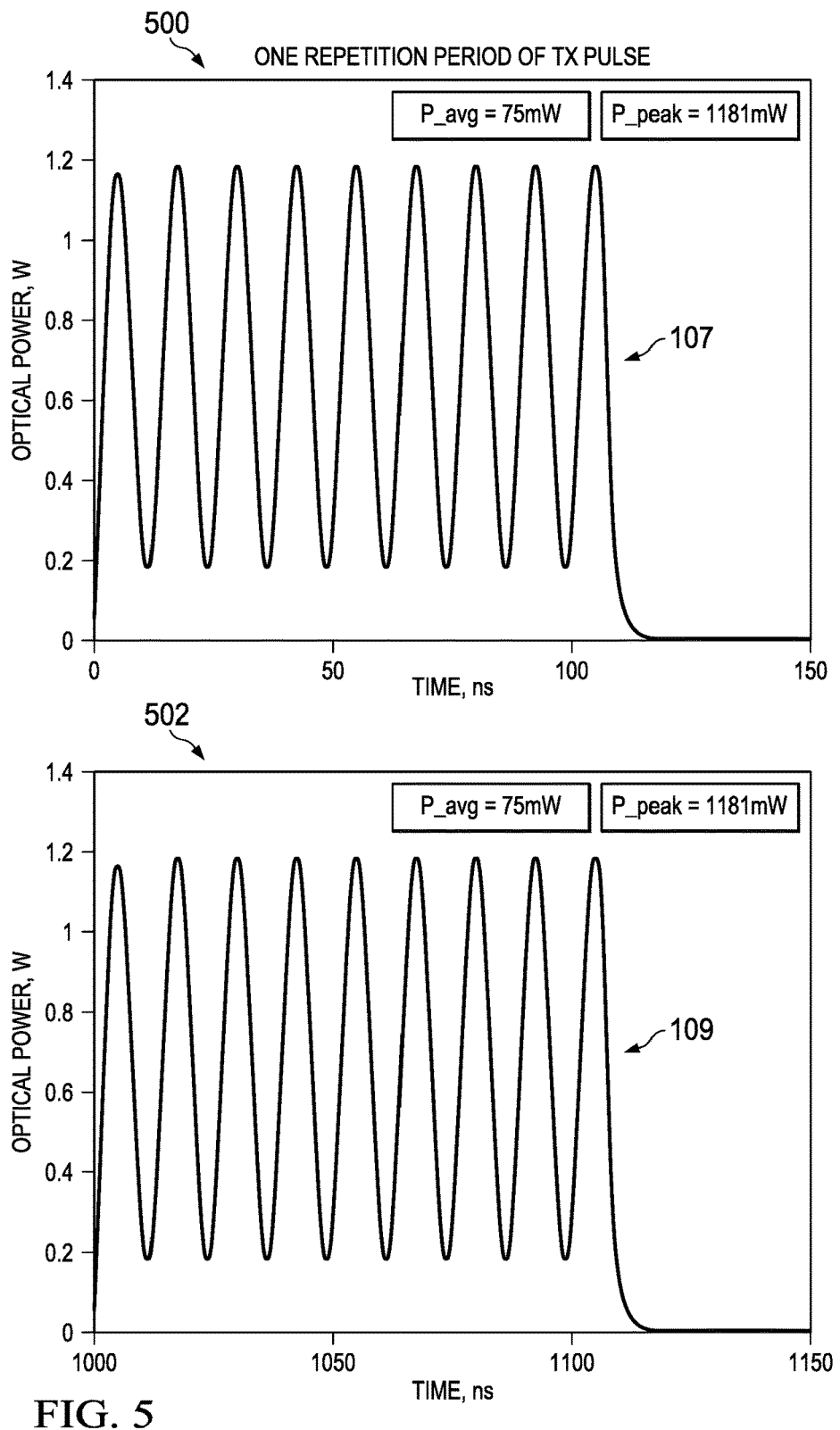
FIG. 5 illustrates graphs of an example reference signal transmitted by the example transmission transducer of FIG. 1.

FIG. 5 illustrates example graphs 500, 502 illustrating the example transmitted signal 107 of FIG. 1 that is transmitted (e.g., via the example transmission transducer 106 of FIG. 1) to the example target 102 (FIG. 1) and the example reflected signal 109 of FIG. 1 that is received by the example receiver reflected signal transducer 110. The example graphs 500, 502 illustrate one repetition period of the transmitted pulse. The example transmitted signal 107 is a narrowband continuous wave modulated pulse at 80 Megahertz with a DC offset, an average power of 75 milliwatts, and a peak power of 1181 milliwatts. Alternatively, the example transmitted signal 107 may be any type of signal oscillating at any frequency with any amplitude. The example transmitted signal 107 begins oscillating at 0 nanoseconds (ns) and continues to oscillating until about 120 ns. The example reflected signal 109 is the example transmitted signal 107 after being reflected off the example target 102 of FIG. 1. The example reflected signal 109 is a wave modulated pulse at 80 Megahertz with a DC offset, an average power of 75 milliwatts, and a peak power of 1181 milliwatts. Alternatively, the example reflected signal 109 may be any type of signal oscillating at any frequency with any amplitude. The example reflected signal 109 begins oscillating at 1000 ns and continues to oscillating until about 1120 ns (e.g., due to the time of flight).

FIG. 6 includes example graphs 600, 602 illustrating the example windowed reference signal 302 and the example windowed reflected signal 304 of FIG. 2. The example windowed signals 302, 304 represent the reference signal and the reflected signal 109 of FIG. 1 after being windowed by the example windower(s) 300 of FIG. 3. The example windowed reference signal 302 increases to around 1.15 milliwatts at around 10 ns and decreases back to 0 milliwatts at around 120 ns. The example windowed reflected signal 304 increases to around 1.15 milliwatts at around 1020 ns and decreases back to 0 milliwatts at around 1140 ns.

FIG. 7 includes example graphs 700, 702 illustrating the example band-pass reflected signal samples 210 and the example band-pass reference signal samples 212 of FIG. 2. The example band-pass reflected signal samples 210 represent the example reflected signal 109 of FIG. 1 (e.g., the example transmitted signal 107 of FIG. 5 after being reflected off the example target 102 of FIG. 1), received and low-pass filtered by the example receiver reflected signal transducer 110, and high-pass filtered by the example high-pass filter 200b of FIG. 2. The example band-pass reflected signal samples 210 begin to oscillate at around 1025 ns and terminates oscillation at around 1350 ns. The example band-pass reference signal samples 212 represent the example reference signal (e.g., the transmitted signal 107 received and low-pass filtered by the example receiver reference signal transducer 108 to generate a reference signal, and high-pass filtered by the example high-pass filter 200a of FIG. 2). The example band-pass reflected signal samples 210 begin to oscillate at around 20 ns and terminates oscillation at around 200 ns.

Figure 8A:
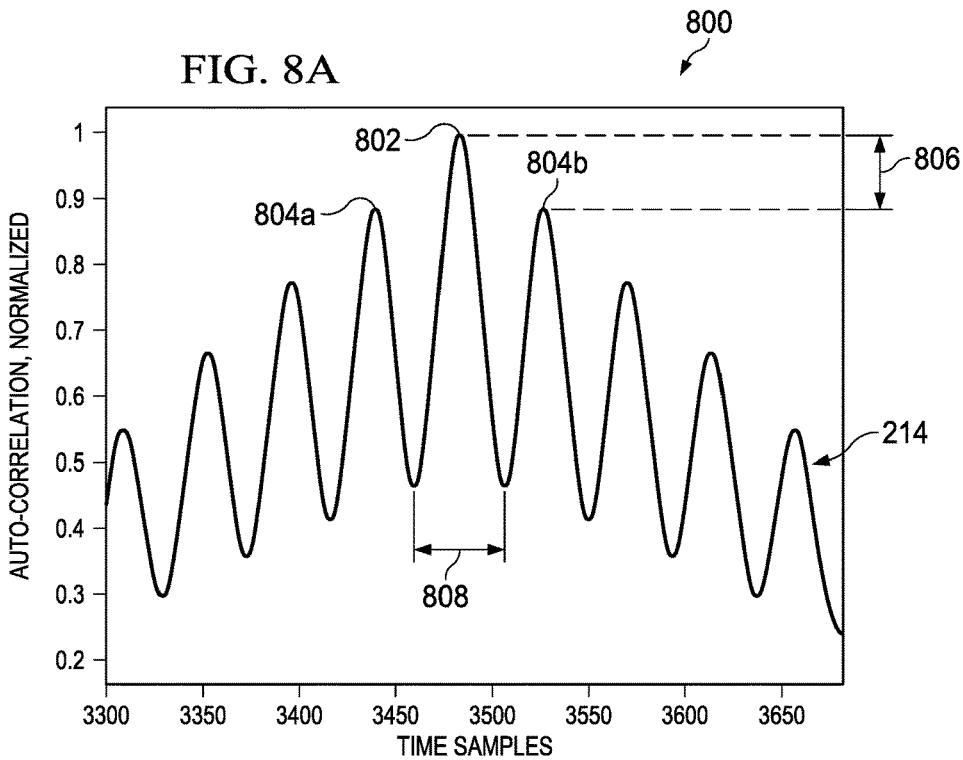
FIGS. 8A and 8B are graphs illustrating example correlations of FIG. 2.
Figure 8B:
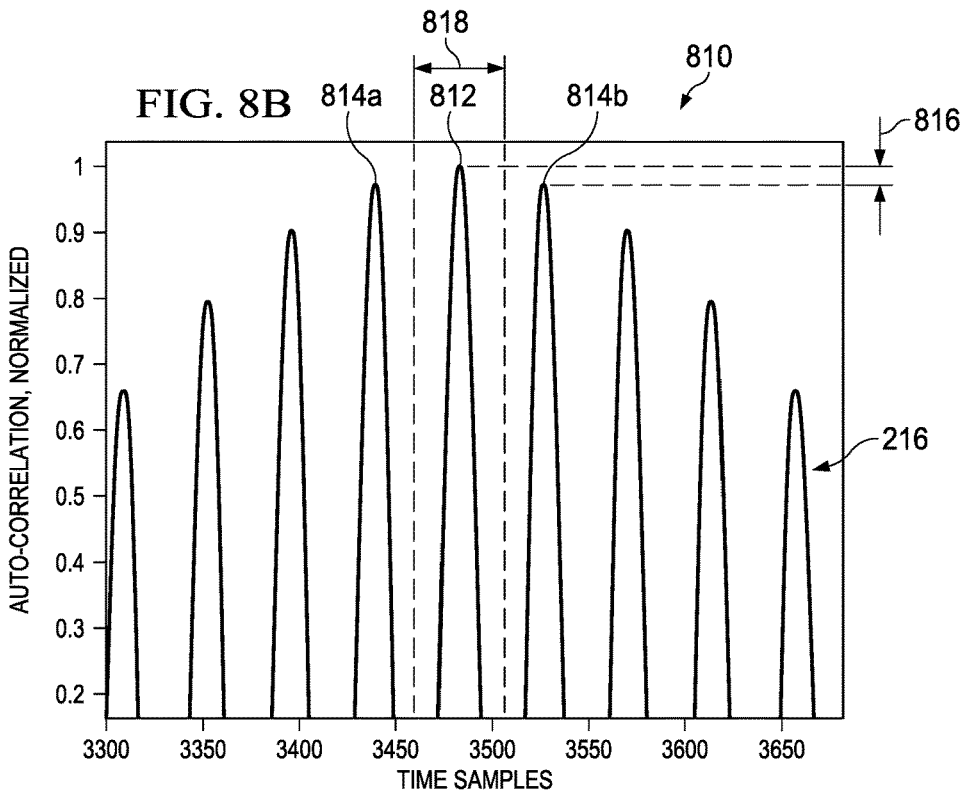

FIGS. 8A and 8B illustrate an example coarse correlation graph 800 including the example coarse correlation 214 and an example fine correlation graph 810 including the example fine correlation 216 of FIG. 2. The example coarse correlation graph 800 includes an example coarse peak 802, example coarse side lobes 804a, 804b, an example coarse peak to side lobe range 806, and an example coarse peak range 808. The example fine correlation graph 810 includes an example fine peak 812, example fine side lobes 814a, 814b, an example fine peak to side lobe range 816, and an example fine peak range 818.

The example coarse peak 802 of FIG. 8A is an intensity value of the coarse correlation 214 with the highest intensity value (e.g., the main lobe). As shown in the example coarse correlation graph 800, the example peak 802 has an intensity value of 1.0 at around the $3480^{th}$ time sample. The $3480^{th}$ time sample corresponds to the time of flight of the reflected signal 109 which may be used to calculate the distance to the example target 102 of FIG. 1. The example coarse side lobes 804a, 804b correspond to the local maximum intensity values closest to the example coarse peak 802. As shown in the example coarse correlation graph 800, the coarse example side lobes 804a, 804b both have an intensity value of 0.88 at around the $3440^{th}$ sample and the $3525^{th}$ sample, respectively. As previously described in conjunction with FIG. 2, the example coarse correlation 214 corresponds to a correlation of either (A) low-pass reference signal samples with low-pass reflected signal samples or (B) a windowed reference signal 302 with a windowed reflected signal 304. Additionally, the example fine correlation 216 corresponds to a correlation of the example band-pass reference signal samples 212 with the example band-pass reflected signal samples 210 of FIG. 2.

The example coarse correlation 214 of FIG. 8A includes the example coarse peak to side lobe range 806 corresponding to a peak to side lobe ratio (e.g., the larger the peak to side lobe range, the higher the peak to side lobe ratio). The higher the peak to side lobe range and/or ratio the more accurate the estimation of the distance to the example target 102 is. As shown in the example coarse correlation graph 800, the example coarse peak to side lobe range 806 is 0.12 (e.g., 1.0-0.88) and the peak to side lobe ratio is 1.14 (e.g., 1.0/0.88). The example coarse correlation 214 includes the example coarse peak range 808 corresponding to the number of time samples between valleys corresponding to the peak. Noise can create spikes at any time sample. Thus, the wider the coarse peak range 808 is, the less precise the estimate of the distance will be because noise can create an artificial peak at a point near the actual peak. As shown in the example coarse correlation 214, the example coarse peak range 808 is around 45 time samples.

The example peak 812 of FIG. 8B is an intensity value of the fine correlation 216 with the highest intensity value (e.g., the main lobe). As shown in the example fine correlation graph 810, the example fine peak 812 has an intensity value of 1.0 at around the $3480^{th}$ time sample. The $3480^{th}$ time sample corresponds to the time of flight of the reflected signal 109 which may be used to calculate the distance to the example target 102 of FIG. 1. The example fine side lobes 814a, 814b correspond to the local maximum intensity values closest to the example fine peak 812. As shown in the example fine correlation graph 810, the example fine side lobes 814a, 814b both have an intensity value of 0.98 at around the $3440^{th}$ sample and the $3525^{th}$ sample, respectively.

The example fine correlation 216 of FIG. 8B includes the example fine peak to side lobe range 816 corresponding to a peak to side lobe ratio (e.g., the larger the peak to side lobe range, the higher the peak to side lobe ratio). The higher the peak to side lobe range and/or ratio the more accurate the estimation of the distance to the example target 102 is. As shown in the example fine correlation graph 810, the example fine peak to side lobe range 816 is 0.02 (e.g., 1.0-0.98) and the peak to side lobe ratio is 1.02 (e.g., 1.0/0.98). Noise can create spikes at any time sample. Thus, the lower the peak to side lobe range and/or ratio is, the higher the change that noise will increase the intensity value of one of the fine example side lobes 814a, 814b to an intensity higher than the example fine peak 812 causing an increased probability of cycle slip. The example fine correlation 216 includes the example fine peak range 818 corresponding to the number of time samples between valleys corresponding to the peak. As shown in the example fine correlation 216, the example fine peak range 818 is around 55 time samples.

As shown in the example correlations 214, 216 of FIGS. 8A and 8B, the example coarse correlation 214 is optimal for accuracy due to the large coarse peak to side lobe range 806 and the example fine correlation 216 is optimal for precision due to the small fine peak range 818. Additionally, because noise applied to the reflected signal 109 associated with the example coarse correlation 214 can create spikes in the example coarse correlation 214 and the coarse peak range 808 is so large, a spike at the $3480^{th}$ time sample may cause an intensity value higher than the actual coarse peak 802 at the $3480^{th}$ time sample, leading to a less precise estimate. Likewise, because noise applied to the reflected signal 109 associated with the example fine correlation 216 can create spikes in the example fine correlation 216 and the fine peak to side lobe range 816 is so low, a spike at the $3440^{th}$ time sample may cause an intensity value higher than the actual fine peak 812 at the $3440^{th}$ time sample causing a cycle slip, leading to a less accurate estimate. The example distance estimator 116 of FIGS. 1 and 2 minimizes the disadvantages and maximize the advantages of the example coarse correlation 214 and the example fine correlation 216 by using the precision of the example fine correlation 216 to identify an optimal time sample estimate based on the time sample associated with the accurate coarse peak 802 of the example coarse correlation 214.

Figure 9:
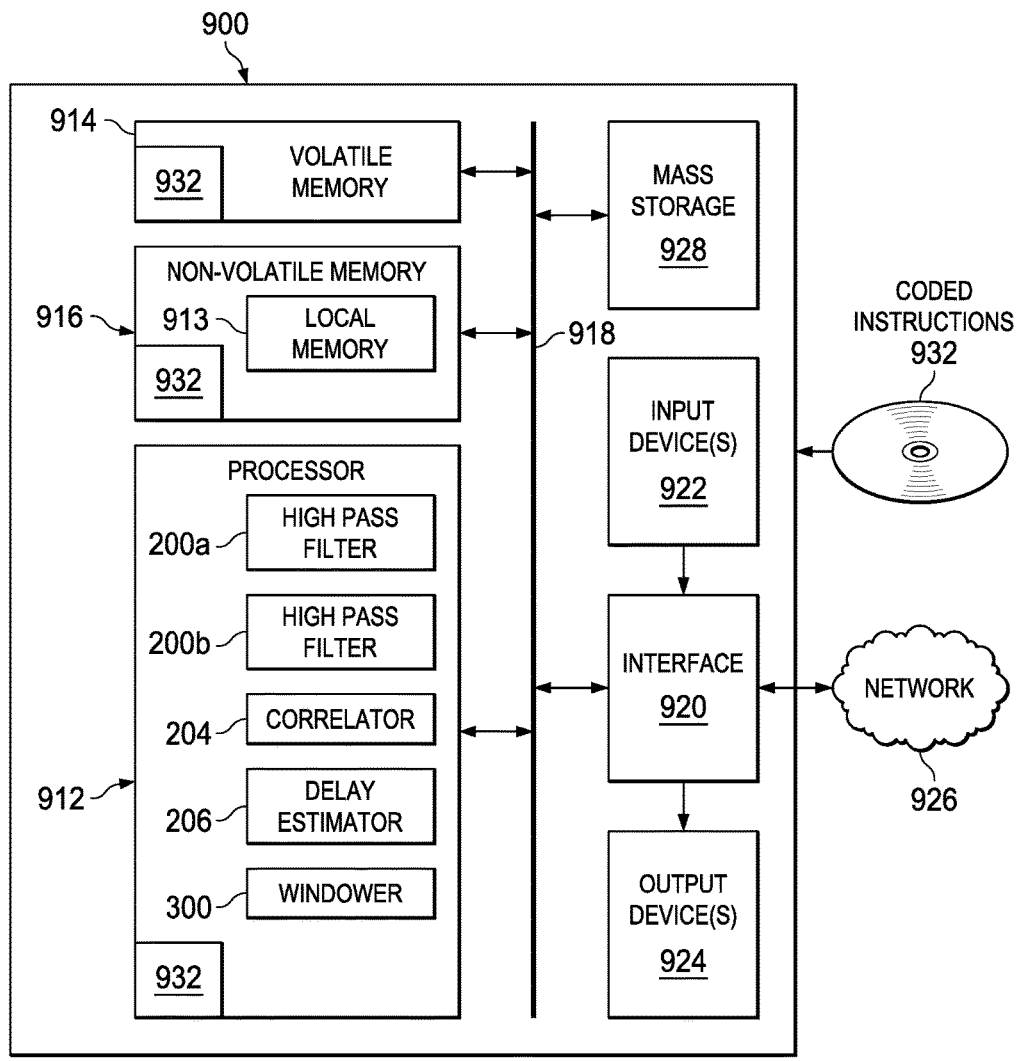
FIG. 9 is a block diagram of a processor platform structured to execute the example machine readable instructions of FIG. 4 to control the example distance estimator of FIGS. 1 and 2.

FIG. 9 is a block diagram of an example processor platform 900 capable of executing the instructions of FIG. 4 to implement the example distance estimator 116 of FIGS. 1, 2, and 3. The processor platform 900 can be, for example, a server, a personal computer, a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by integrated circuits, logic circuits, microprocessors or controllers from any desired family or manufacturer.

The processor 912 of the illustrated example includes a local memory 913 (e.g., a cache). The example processor 912 of FIG. 9 executes the instructions of FIG. 4 to implement the example high-pass filters 200a, 200b the example correlator(s) 204, the example delay estimator 206, and the example windower(s) 300 of FIGS. 2 and/or 3 to implement the example distance estimator 116. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a clock controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and commands into the processor 912. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIG. 4 may be stored in the mass storage device 928, in the volatile memory 914, in the non-volatile memory 916, and/or on a removable tangible computer readable storage medium such as a CD or DVD.

From the foregoing, it would be appreciated that the above disclosed method, apparatus, and articles of manufacture accurately determine a distance of a target by determining a time of flight for a reflected signal based on a coarse correlation of narrowband low-pass signals and a fine correlation of narrowband band-pass signals. Examples disclosed herein combine the accuracy of the coarse correlation with the precision of the fine correlation to create a highly accurate and highly precise estimate of the target. Examples disclosed herein reduce range error standard deviation by 18% which is equivalent to 20% reduction of transmission power. Additionally, examples disclosed herein significantly reduce the probability of cycle slip (e.g., mistakenly determining that a side lobe is a peak due to spikes associated with noise).

Some conventional techniques only low-pass filter a reference signal and a reflected signal. However, such conventional techniques have less precise distance estimations due to noise around a peak of a correlation of the low-pass signals causing the peak to be used to make the distance estimation. Other conventional techniques only band-pass filter a reference signal and a reflected signal. However, such conventional techniques have an increased probability of cycle slip due to noise around a side lobe of a correlation of the low-pass signals causing the side lobe to be used to make the distance estimation. Examples disclosed herein alleviate such problems associated with such conventional techniques by using a coarse correlation of the low-pass reference signal and the low-pass reflected signal to determine an accurate estimation range and a band-pass fine correlation of the band-pass reference signal and the reflected signal to determine a precise estimation within the accurate estimation range.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
receiving a reference signal and a reflected signal, the reflected signal being the reference signal after being reflected off a target;
generating a band-pass reference signal and a band-pass reflected signal by filtering (A) reference signal samples associated with the reference signal and (B) reflected signal samples associated with the reflected signal;
generating a first correlation by correlating the reference signal samples with the reflected signal samples and a second correlation by correlating the band-pass reference signal with the band-pass reflected signal;
determining a distance to the target based on the first correlation and the second correlation; and
outputting a signal including the distance to the target.

2. The method of claim 1, further including:
determining a first time sample of a first peak of the first correlation; and
determining a second time sample of a second peak of the second correlation based on the first time sample.

3. The method of claim 2, wherein the second correlation includes a plurality of peaks, the second peak being one of the plurality of peaks that is closest to the first time sample of the first peak.

4. The method of claim 3, wherein the determining of the distance to the target is based on the second time sample, the second time sample correlating to the distance.

5. The method of claim 1, wherein the first correlation is a coarse correlation and the second correlation is a fine correlation.

6. The method of claim 5, wherein the coarse correlation corresponds to a high accuracy, low precision distance estimate and the fine correlation corresponds to a low accuracy, high precision distance estimate.

7. The method of claim 1, wherein the reference signal and the reflected signal are low-pass filtered prior to the first correlation.

8. The method of claim 1, wherein the reference signal and the reflected signal are low-pass filtered and then high-pass filtered prior to the second correlation.

9. The method of claim 1, wherein the reference signal samples and the reflected signal samples are windowed prior to the first correlation to increase an accuracy associated with the determination of the distance.

10. The method of claim 1, wherein:
the reference signal is a narrowband signal; and
the filtering of the narrowband signal maximizes a signal to noise ratio of the narrowband signal.

11. An apparatus comprising:
a transducer to receive a reference signal and a reflected signal, the reflected signal being the reference signal after being reflected off a target;
a filter to generate a band-pass reference signal and a band-pass reflected signal by filtering (A) reference signal samples associated with the reference signal and (B) reflected signal samples associated with the reflected signal;
a correlator to generate a first correlation by correlating the reference signal samples with the reflected signal samples and a second correlation by correlating the band-pass reference signal with the band-pass reflected signal; and
a delay estimator to determine a distance to the target based on the first correlation and the second correlation and output a signal including the distance to the target.

12. The apparatus of claim 11, wherein the delay estimator is structured to:
determine a first time sample of a first peak of the first correlation; and
determine a second time sample of a second peak of the second correlation based on the first time sample.

13. The apparatus of claim 12, wherein the second correlation includes a plurality of peaks, the second peak being one of the plurality of peaks that is closest to the first time sample of the first peak.

14. The apparatus of claim 13, wherein the delay estimator is structured to determine the distance to the target based on the second time sample, the second time sample correlating to the distance.

15. The apparatus of claim 11, wherein the first correlation is a coarse correlation and the second correlation is a fine correlation.

16. The apparatus of claim 15, wherein the coarse correlation corresponds to a high accuracy, low precision distance estimate and the fine correlation corresponds to a low accuracy, high precision distance estimate.

17. The apparatus of claim 11, wherein the reference signal and the reflected signal are low-pass filtered prior to the first correlation.

18. The apparatus of claim 11, wherein the filter is structured to low-pass filter and then high-pass filter the reference signal samples and the reflected signal samples prior to the second correlation.

19. The apparatus of claim 11, further including a windower to window the reference signal samples and the reflected signal samples prior to the first correlation, the windowing increasing an accuracy associated with the determination of the distance.

20. The apparatus of claim 11, wherein:
the reference signal is a narrowband signal; and
the filtering of the narrowband signal maximizes a signal to noise ratio of the narrowband signal.

* * * * *